I. BOND.
CONTROLLING MECHANISM FOR ELECTRIC MOTORS FOR IRONING MACHINES.
APPLICATION FILED NOV. 15, 1919.
1,339,917.   Patented May 11, 1920.
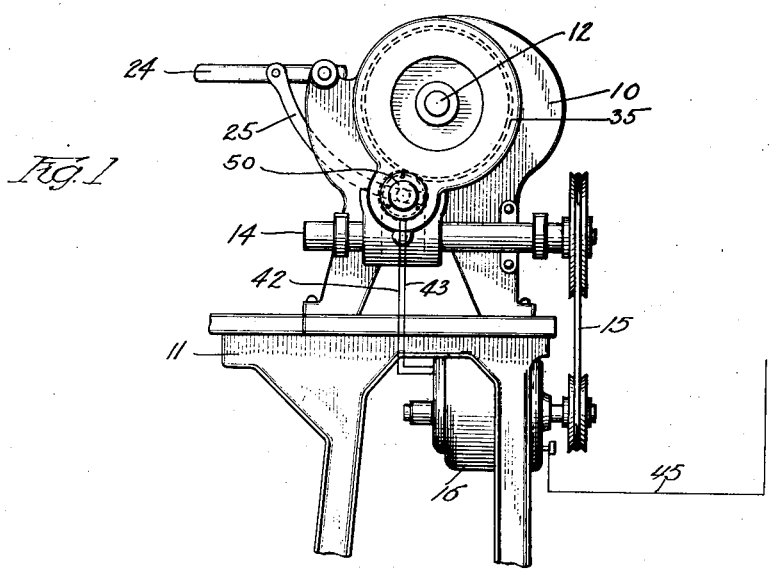
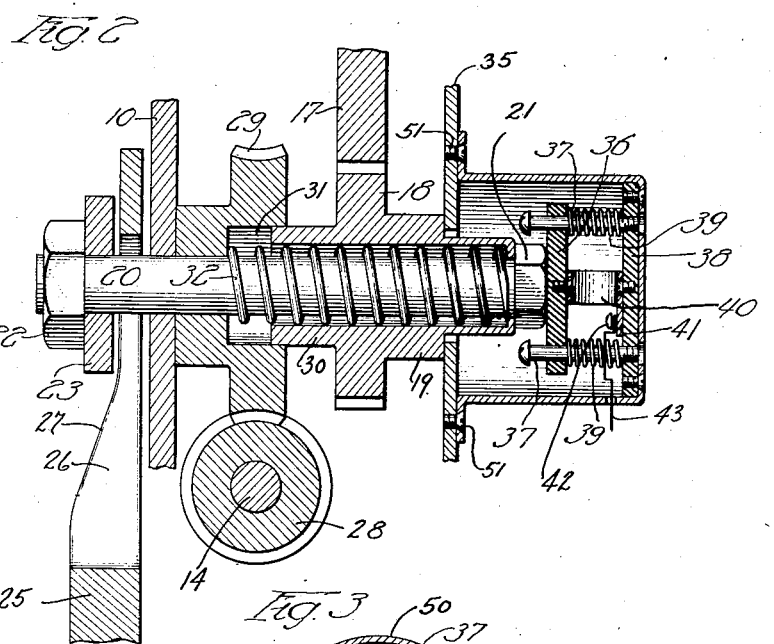
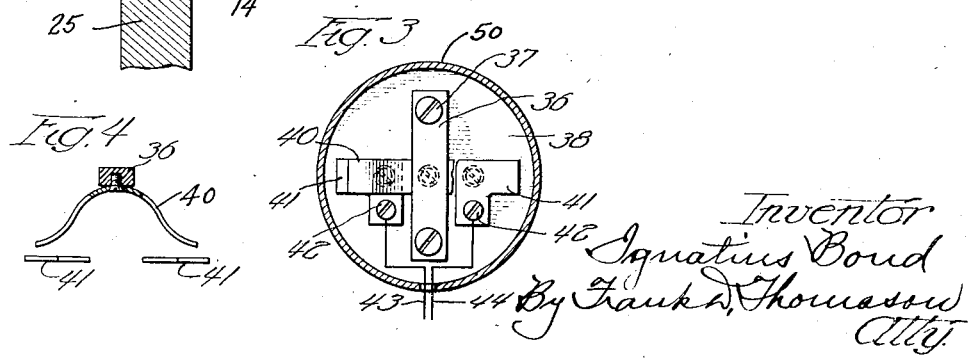

UNITED STATES PATENT OFFICE.

IGNATIUS BOND, OF EVANSTON, ILLINOIS.

CONTROLLING MECHANISM FOR ELECTRIC MOTORS FOR IRONING-MACHINES.

1,339,917.   Specification of Letters Patent.   Patented May 11, 1920.

Application filed November 15, 1919. Serial No. 338,354.

*To all whom it may concern:*

Be it known that I, IGNATIUS BOND, a citizen of the United States, residing at 1410 Chicago avenue, Evanston, Cook county, and State of Illinois, have invented new and useful Improvements in Controlling Mechanism for Electric Motors for Ironing-Machines, of which the following is a full, clear, and exact description.

My invention relates to means for stopping and starting the electric motors employed to actuate ironing machines, and particularly for the ironing machines now in extensive use and known to the public and to the trade as the "Simplex" ironing machine.

The object of the improvements constituting my invention is to start the motor every time the feed-board of said ironing machine is moved into a horizontal position to move the cylinder toward the ironing plate, and to support the work preparatory to feeding it to said cylinder and to stop said motor every time said feed-board is moved into a vertical position to move the cylinder away from said ironing-plate, and a further object is to accomplish this result by simple and economical means which can be applied to either a new or an old ironing machine of this type, easily and quickly. This I accomplish by the means hereinafter fully described and as particularly pointed out in the claims.

In the drawings:

Figure 1 is an end view of an ironing machine showing my improvements applied thereto.

Fig. 2 is the transverse section of a portion of the actuating mechanism of an ironing machine showing my improvements drawn to a large scale.

Fig. 3 is a section of the switch, taken on dotted line 3, 3, Fig. 2.

Fig. 4 is an edge view of the switch plate alone.

Referring to the drawings, 10 represents one of the vertical end-frames of an ironing machine, that has feet that rest upon and are suitably secured to the top of a table or other support 11. This frame has an opening therein out through which the adjacent end 12 of the shaft of the cylinder (not shown) extends and also has bearings for a transverse drive-shaft 14 located at or near the feet thereof. One end of said drive-shaft extends beyond its bearings and beyond the rear edge of the table and has a pulley thereon which is driven through the medium of a belt 15, by an electric motor 16, which latter is supported in any suitable manner, preferably, below the top of the table.

The adjacent end of the cylinder shaft has a gear, 17, thereon, and this gear is engaged by a pinion 18, that is integral with a sleeve 19, which latter is concentric with a shaft or spindle 20, whose inner end is journaled in suitable bearings in the end-frame 10. The diameter of spindle 20 is less than that of the inner circumference of sleeve 19, and its outer screw-threaded end extends out through the outer end of sleeve 19, and has a nut 21 thereon that locks it to the same. The inner end of said spindle extends through its bearings and is screw-threaded and has a nut 22 thereon and also has a washer 23 mounted thereon next said nut.

A feed-board 24 is pivotally connected at its end to the end-frame 10 of the ironing machine, substantially as shown in Fig. 1 of the drawings, and at the end adjacent to spindle 20, a curved arm 25, is pivotally secured to its end edge, that extends to and past spindle 20 between washer 23 and end-frame 10, and has an elongated slot 26 therein through which said spindle passes. The lower end portion of this arm including a portion of the slotted part is made thinner than the remainder and the thinner portion is merged into the thicker by curving the rear side to provide a wedge 27. When the feed-board is moved downward on its axis, the wedge 27 of arm 25 comes between washer 23 and end-frame 10, and moves the spindle toward the center of length of the ironing machine and carries the pinion 18 out of mesh with the gear 17. When the feed-board is raised into a horizontal position the wedge portion of arm 25 is withdrawn from between the end-frame and the washer 23, and the spindle automatically moves toward its outer end and brings pinion 18 into mesh with gear 17.

The power for driving the ironing machine is derived from the drive-shaft 14, by means of a worm, 28, securely mounted thereon, and a worm-gear 29 loosely mounted upon spindle 20 between pinion 18 and the end-frame 10.

The bore of the worm-gear 29 on the side nearest the pinion 18 is increased in diameter and forms a pocket 31 and the boss 30 of said pinion 18 extends toward and into this pocket, and said worm-gear has a boss that is directly mounted on spindle 20, that extends toward and comes in contact with end-frame 10 and thus spaces the worm-gear away from the end-frame. A coil expansion-spring, 32, surrounds the spindle between shoulder 31 and the outer closed opposide end of the sleeve 19 of pinion 18, and it is this spring that automatically moves the spindle toward its inner end when the wedge portion of arm 25 is moved between washer 23 and the end-frame 10.

The outer movement of the pinion 20 and of the pinion 18 is stopped by increasing the diameter of the outer projecting part of its boss to form a shoulder 34 which engages the margins of an opening in a casing 35 within which said gearing is housed, and out through an opening in which the outer closed end 33 of the boss of the pinion 18 projects.

My invention employs the outward thrust of the longitudinally reciprocal movement of this spindle to operate a switch that opens and closes the electric circuit in which the motor is included. This switch consists of a cross-bar 36 of fiber or other insulated material which is supported on the inner smooth portion of the barrels of screws 37. The heads on the inner ends of these screws limit the inward movement of said cross-bar and the outer screw-threaded ends of said screws are tapped into a supporting plate 38 of suitable insulating material, between which latter and said cross-bar said screws are surrounded by coil expansion-springs 39, to yieldingly retain the cross-bar at the limit of its inner movement, supporting-plate 38 is secured to the inner surface of the bottom of a cup-shaped shell 50 the annular edges of which are held in contact with the casing 35 by screws 51, 51. Midway its length the outer side of bar 36 has a metallic bow-shaped plate 40 secured thereto at its center of length by means of a screw or otherwise. The ends of this bow-shaped plate are, preferably, curved slightly away from the supporting plate 38 and are adapted when the bar 36 is pushed toward the supporting-plate 38 to come in frictional contact with the angle-shaped contact-plates 41, which latter are secured by means of screws or otherwise located preferably, near their angles, against supporting-plates 38. These contact plates are each provided with a suitable binding-post 42 from which the positive and negative wires 43, and 44, respectively extend to the positive and negative poles (not shown) of the motor.

The center of length of bar 36 is always in contact with the outer end of spindle 20 and when the feed-board is raised and the wedge portion of the arm 25 is withdrawn from between washer 23 and the end-frame 10, the spring 32 automatically moves said spindle toward the outer limit of its reciprocal movement which presses the bar 36 toward the supporting-plate 38 and brings the ends of the plate 40 in contact with the positive and negative contact-plates and closes the motor circuit and starts the motor, which latter through the medium of the belt 15 revolves the drive-shaft. The drive-shaft through the medium of the worm 28 actuates worm-gear 29, and the latter to which the boss of the pinion 18 is splined (not shown) rotates said pinion 18, which latter is carried into mesh with gear 17, when spindle 20 is moved toward and is at the outer limit of its movement. At the same time the spindle 20 comes in contact with bar 36, of the switch and moves the same toward the supporting-plate 38 and carries plate 40 into contact with the contact-plates 41, and closes the motor circuit. When the feed-board is moved downward and the wedge of arm 25 is forced between the washer 23 and the end-plate 10, the spindle is moved to the rear together with pinion 18, which latter is thus disengaged from the gear 17, whereupon the cylinder ceases to revolve. As the spindle moves to the rear the springs 39 move the cross-bar 36 in the same direction as the spindle is moved and the plate 40 moves out of contact with the contact-plates and opens the motor circuit and stops the motor.

The motor is driven through the medium of a two wire extension cord 45, which can be attached to a plug or electric light socket (not shown).

What I claim as new is:

1. In an ironing machine the combination with the end-frames thereof, a cylinder journaled between said end-frames, mechanism that revolves said cylinder, an electric motor actuating said mechanism, and a feed-board pivoted at its ends, of an electric circuit in which said motor is included, a switch for connecting the terminals of said circuit, and means for transmitting the motion of said feed-board to said switch to open and close said circuit.

2. In an ironing machine the combination with the end-frames thereof, a cylinder journaled between said end-frames, mechanism that revolves said cylinder, an electric motor actuating said mechanism, and a feed-board pivoted at its ends, of an electric circuit in which said motor is included, a switch for connecting the terminals of said circuit, and means for transmitting the motion of said feed-board through the medium of said mechanism to said switch to open and close said circuit.

3. In an ironing machine the combination with the end-frames thereof, a cylinder journaled between said end-frames, mechanism that revolves said cylinder including a longitudinally reciprocal spindle, an electric motor actuating said mechanism, and a feed-board pivoted at its ends, of an electric circuit in which said motor is included, a switch for connecting the terminals of said circuit, and means for transmitting the motion of said feed-board through the medium of said spindle to said switch to open and close said circuit.

4. In an ironing machine the combination with the end-frames thereof, a cylinder journaled between said end-frames, mechanism that revolves said cylinder including a longitudinally reciprocal spindle, an electric motor actuating said mechanism, a feed-board pivoted at its ends, and a link pivoted to the said feed-board at one end and having its opposite end engage said spindle and impart reciprocal motion thereto, of an electric circuit in which said motor is included, a switch for connecting the terminals of said circuit which is engaged by the ends of the spindle opposite said arm to open and close said circuit.

5. In an ironing machine the combination with the end-frames thereof, a cylinder journaled between said end-frames, mechanism that revolves said cylinder including a longitudinally reciprocal spindle, an electric motor actuating said mechanism, a feed-board pivoted at its ends, a link pivoted to the said feed-board at one end and having its opposite end slotted for said spindle to pass therethrough and provided with a wedge between said slot and its pivot that engages and imparts reciprocal motion thereto, of an electric circuit in which said motor is included, a switch for connecting the terminals of said circuit which is engaged by the end of the spindle opposite said arm to open and close said circuit.

In witness whereof I have hereunto set my hand and seal this 10th day of November, 1919.

IGNATIUS BOND.

Witnesses:
VIOLET WARDELL,
FRANK D. THOMASON.